(12) United States Patent
Fleury et al.

(10) Patent No.: US 7,440,011 B2
(45) Date of Patent: Oct. 21, 2008

(54) METHOD FOR THE REAL-TIME PROCESSING OF A SIGNAL REPRESENTING AN IMAGE

(75) Inventors: Benoist Fleury, Bobigny Cedex (FR); David Hue, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 910 days.

(21) Appl. No.: 10/397,734

(22) Filed: Mar. 26, 2003

(65) Prior Publication Data

US 2003/0184827 A1   Oct. 2, 2003

(30) Foreign Application Priority Data

Mar. 29, 2002   (FR) .................................... 02 04170

(51) Int. Cl.
*H04N 5/235* (2006.01)
*G03F 3/08* (2006.01)

(52) U.S. Cl. .................................... 348/229.1; 358/520

(58) Field of Classification Search ................ 358/520; 348/222.1, 362, 235, 239, 229.1, 364, 221.1; 382/270

See application file for complete search history.

(56) References Cited

U.S. PATENT DOCUMENTS

| | | | |
|---|---|---|---|
| 5,638,119 A | 6/1997 | Cornuejols | 348/229 |
| 6,075,574 A * | 6/2000 | Callway | 348/673 |
| 6,204,881 B1 * | 3/2001 | Ikeda et al. | 348/362 |

(Continued)

FOREIGN PATENT DOCUMENTS

| | | |
|---|---|---|
| EP | 0 387 817 | 9/1990 |
| EP | 1 237 363 | 9/2002 |
| FR | 2 565 753 | 12/1985 |
| FR | 2 660 822 | 10/1991 |
| WO | 01/39490 | 5/2001 |

OTHER PUBLICATIONS

Preliminary Search Report, Nov. 4, 2002.

*Primary Examiner*—David Ometz
*Assistant Examiner*—Pritham Prabhakher
(74) *Attorney, Agent, or Firm*—Morgan & Finnegan, LLP

(57) ABSTRACT

A signal representing an image generated by at least one photosensitive device is processed in real-time to supply, from a scene to be observed having a high dynamic range between the signals corresponding to the darkest areas and to the brightest areas, an image containing no blooming areas. Images of different sensitivities are formed from the same scene to be observed. The brightness level of each point on the most sensitive image is determined. This level is compared with a predetermined threshold. The signal of the most sensitive image is delivered to the display device, for each elementary point on the most sensitive image having a brightness level below the predetermined threshold. An image signal calculated according to the brightness levels of the same elementary point in the images of different sensitivities is delivered to the display device, for any other elementary point on the most sensitive image.

According to the present invention, images of different sensitivities are formed from the same scene to be observed, the brightness level of each elementary point on the most sensitive image is determined, this level is compared with a predetermined threshold, the signal of the most sensitive image is delivered to the display device, for each elementary point on the most sensitive image having a brightness level below the predetermined threshold, and an image signal calculated according to the brightness levels of the same elementary point in the images of different sensitivities are delivered to the display device, for any other elementary point on the most sensitive image.

10 Claims, 1 Drawing Sheet

U.S. PATENT DOCUMENTS

| | | | |
|---|---|---|---|
| 6,330,302 B1 | 12/2001 | Joosten | 378/98.12 |
| 6,720,993 B1 * | 4/2004 | Hwang et al. | 348/208.13 |
| 6,879,345 B2 * | 4/2005 | Kawanishi | 348/362 |
| 6,906,745 B1 * | 6/2005 | Fossum et al. | 348/229.1 |
| 7,133,069 B2 * | 11/2006 | Wallach et al. | 348/218.1 |
| 2003/0095192 A1 * | 5/2003 | Horiuchi | 348/222.1 |

* cited by examiner

METHOD FOR THE REAL-TIME PROCESSING OF A SIGNAL REPRESENTING AN IMAGE

FIELD OF THE INVENTION

The present invention concerns a method for the real-time processing of a signal representing an image, this signal being supplied for example by CCD sensors (charge coupling sensors), CMOS (Complementary Metal Oxide Semiconductor) sensors or video cameras. These sensors or cameras are grouped together in the present description under the generic term photosensitive devices.

BACKGROUND OF THE INVENTION

CCD sensors have excellent sensitivity at low lighting levels. They are for example capable of providing a usable signal for objects and scenes whose lighting levels may be as low as 0.003 lux.

However, if the objects or scenes to be observed are very bright, the elementary points or pixels of the CCD sensor receiving the most light are very rapidly saturated and a phenomenon is then observed which is known in the art by the English term "blooming", which results from a greater exposure to light than that which takes a sensor pixel to saturation. The excess charges generated then interfere with the adjoining pixels. The result is thus a dazzling of the CCD sensor, and the image of the very bright object is unusable throughout the region adjoining this dazzling object. In the present description the term "blooming" will be used to designate this phenomenon of dazzling.

CMOS sensors are less sensitive to this phenomenon of blooming but cannot give a usable signal for objects or scenes which are not very bright.

It is well known how to attempt to reduce blooming by controlling the sensor or camera, reducing the exposure time of each image so as to reduce the blooming in very bright areas. The result then is that the contrast in the not very bright areas is greatly degraded. If the gain of the camera is then increased in order to improve the visibility of the low levels, the level of noise in the signal corresponding to the dark areas is also increased, which results in a "snowy" image of the dark areas, whose rendition is greatly degraded. Such a solution does not therefore make it possible to obtain a sufficient dynamic range for the signal, and hence it is for example desirable to obtain a usable image with a dynamic range of 170 dB between the signal corresponding to the darkest areas and the signal corresponding to the lightest areas of the same image.

Another solution is proposed by the document FR-A-2 565 753, which discloses a method for slaving the sensitivity of a photosensitive charge transfer device, used for example in a television camera, to the illumination which it receives, in order to avoid the blooming and saturation effects. This method consists of using antiblooming drains which the device has for discharging the charges generated by the light during a first part of the period of analysis of each frame. A slaving device determines the duration of the discharge according to the values of the video signal obtained. To discharge the charges to the antiblooming drains, which are kept at a constant potential by electrodes which surmount them, a pulsed voltage is applied simultaneously to the two transfer electrodes surmounting each photosensitive element of the device. A series of pulses is provided for discharging the accumulated charge fraction by fraction. This series of pulses is applied during the line suppression interval of the video signal in order to prevent stray couplings causing interference to this video signal.

Likewise, the document EP-A-1 237 363 discloses a solid-state image formation device comprising a solid-state image formation element supplying a plurality of image signals which differ from each other through their exposure time, and signal synthesis means for synthesising these image signals supplied by the solid-state image formation element, in which at least one of the image signals has a number of pixels smaller than the number of pixels of the other image signals, for the purpose of increasing the dynamic range of the retrieved images.

These last two solutions involve the production and use of specific photosensitive devices, which may not be adapted to all situations and which are relatively expensive.

There is also known from the document FR-A-2 660 822 a double-shot camera producing images with a high dynamic range, comprising a primary image sensor, a secondary source of image information corresponding to the same image as the one picked up by the primary image sensor but at a much lower sensitivity, and a means of combining the signals coming from the primary image sensor and the image information source.

All these known solutions are intended to increase the dynamic range of the final images supplied to the user but do not have as a common objective an increase in the sensitivity of the final image. Thus, where several images are captured of the same scene, the sensor supplying the one which has the highest sensitivity always remains in a dynamic operating range possibly going as far as saturation, but never as far as a phenomenon of blooming or dazzling.

The present invention is situated in this context and its purpose is to propose a method for the real-time processing of the signal generated by a sensor or a camera in order to supply, from a scene or object having a high dynamic range between the signal corresponding to the darkest areas and the signal corresponding to the brightest areas, a high-sensitivity image free from blooming areas and in which the areas whose luminosity is below a predetermined threshold are sufficiently contrasted, the predetermined threshold being able to be adjusted, for example according to the ambient luminosity or other criteria, such a method having to be able to be implemented without modification to existing sensors or cameras.

SUMMARY OF THE INVENTION

The object of the present invention is therefore a method for the real-time processing of a signal representing an image generated by at least one photosensitive device in order to supply, from a scene to be observed having a high dynamic range between signals corresponding to the darkest areas and those which correspond to the brightest areas, an image free from blooming areas, the method comprising the steps consisting of:

forming an actual image of the scene to be observed on the photosensitive device or devices by means of an optical system,
 controlling the photosensitive device or devices so that they generate per second a first predetermined number of image signals of the scene to be observed,
 collecting the image signals generated by the photosensitive device and devices,
 processing the image signals generated by the photosensitive device or devices,
 converting the processed signals into video signals,
 delivering the video signals to a display device, displaying on the display device a second predetermined number of images per second corresponding to the processed image signals, the step of controlling the photosensitive device or devices comprising the generation of image signals of the same scene to be observed with at least first and second different sensitivities, the first sensitivity being greater than the second, the step of processing the signals generated by the photosensitive device or devices itself comprises the steps consisting of:

determining the brightness level of each elementary point on the image having the first sensitivity and of each elementary point on the image having the second sensitivity, and delivering to the display device for each elementary point on the final image an image signal calculated according to the levels of brightness of the same elementary point in the images of first sensitivity and second sensitivity.

According to the present invention, the method also comprises the steps consisting of:

comparing the brightness level of each elementary point on the image of first sensitivity with a predetermined threshold, delivering to the display device, for each elementary point on the image of first sensitivity having a brightness level below the predetermined threshold, the signal of the image of first sensitivity, and delivering to the display device, for any other elementary point on the image of first sensitivity, an image signal calculated according to the brightness levels of the same elementary point in the images of first sensitivity and second sensitivity.

Advantageously, according to a first processing method, the image signals delivered to the display device have, for each elementary point, a brightness level equal to that of the corresponding point on the image of first sensitivity where this has a brightness level less than or equal to the predetermined threshold, calculated so as to be included between the brightness levels of the corresponding points on the images of first and second sensitivities for the elementary points on the image of first sensitivity whose brightness level is greater than the predetermined threshold;

the brightness level of each point on the final image is calculated according to the brightness level of the elementary point on the image of second sensitivity corresponding to an elementary point on the image of first sensitivity having a brightness level above the predetermined threshold;

the function of the brightness level of the elementary point on the image of second sensitivity is of the form:

$$N_3 = N_2 + (S_1 - S_2) * \frac{(K - N_2)}{(K - S_2)}$$

where:

$N_2$ is the brightness level of the elementary point on the image of second sensitivity corresponding to an elementary point on the image of first sensitivity having a brightness level above the predetermined threshold, $N_3$ is the brightness level of the elementary point on the final image corresponding to an elementary point on the image of first sensitivity having a brightness level above the predetermined threshold, $S_1$ is the predetermined threshold value for an elementary point of the image of first sensitivity, $S_2$ is the brightness level of the elementary point on the image of second sensitivity corresponding to a point on the image of first sensitivity having a brightness level equal to $S_1$, and K is the number of different brightness levels which the photosensitive device is capable of distinguishing.

According to a second embodiment:

the signals delivered to the display device have, for each elementary point, a brightness level equal to that of corresponding point on the image of first sensitivity where the latter has a brightness level below a predetermined threshold, equal to a weighted sum of the brightness levels of the corresponding points on the images of first and second sensitivity for each elementary point on the image of first sensitivity whose brightness level is greater than or equal to the predetermined threshold;

for each elementary point on the image of first sensitivity whose brightness level is greater than or equal to the predetermined threshold, the brightness level of the signal delivered to the display device consists of approximately 30% of the brightness level of the image of second sensitivity and 70% of the brightness level of the image of first sensitivity;

the image signals delivered to the display device have, for each elementary point, a brightness level equal to that of the corresponding point on the image of first sensitivity when the latter has a brightness level less than or equal to the predetermined threshold, equal to that of the corresponding point on the image of second sensitivity when the corresponding point on the image of first sensitivity has a brightness level equal to a maximum value, calculated so as to be included between the brightness levels of the corresponding points on the images of first and second sensitivities for the elementary points on the image of first sensitivity whose brightness level is between the predetermined threshold and the maximum value;

the brightness level is calculated by means of a linear equation between the brightness levels of the corresponding elementary points on the images of first and second sensitivities;

the linear equation is of the form:

$$N_{(P_{3(i,j)})} = \left(N_{(P_{1(i,j)})} * \left(\frac{N_{max} - N_{(P_{1(i,j)})}}{N_{max} - N_s}\right)\right) + \left(N_{(P_{2(i,j)})} * \left(1 - \frac{N_{max} - N_{(P_{1(i,j)})}}{N_{max} - N_s}\right)\right)$$

where, for each pair of coordinates i and j of an elementary point:

$P_{1(i,j)}$ is an elementary point on the image of first sensitivity, $P_{2(i,j)}$ is an elementary point on the image of second sensitivity, $P_{3(i,j)}$ is an elementary point on the image displayed on the display screen, $N_{(P_{1(i,j)})}$ is the brightness level of the elementary point $P_{1(i,j)}$, $N_{(P_{2(i,j)})}$ is the brightness level of the elementary point $P_{2(i,j)}$, $N_{(P_{3(i,j)})}$ is the brightness level of the elementary point $P_{3(i,j)}$, $N_{max}$ is the maximum brightness level of the image of first sensitivity, and $N_s$ is the brightness level of the predetermined threshold.

Whatever the embodiment, according to a first embodiment:

- the photosensitive device is the only one, and functions at a frequency which is an integer multiple of that in which the images are displayed on the display device;
- the image of first sensitivity is generated by the photosensitive device having nominal functioning, and in that the image of second sensitivity is generated by the photosensitive device having modified functioning;
- the image of second sensitivity is underexposed;
- the underexposure is obtained by an electronic control of the photosensitive device, or by an obturator having two unequal openings presented successively in front of the photosensitive device in synchronism with its nominal operating periods and its modified operating periods.

According to a second embodiment:

- the images of first and second sensitivities are obtained by means of distinct photosensitive devices;
- the photosensitive devices are synchronised in order to supply to the image signal processing means image signals comprising elementary points which can be matched both in time and in space;
- the distinct photosensitive devices are of the same technology, one having nominal operating characteristics to give an image of first sensitivity, the other having modified operating characteristics in order to supply an image of second sensitivity;
- the image of second sensitivity is obtained by electronic control of the photosensitive devices so as to obtain an underexposed image;
- the distinct photosensitive devices are of different technologies and supply images of different sensitivities.

Advantageously, in all cases, provision can be made for:

- the image signal processing step to be performed only when the image of first sensitivity has blooming areas,
- when the image of first sensitivity is free from blooming areas, the image signal delivered to the display device to be that of the image of first sensitivity,
- the brightness of the scene to be observed to be measured by a detector,
- the detector to consist of a counter for the number of elementary points on the image of second sensitivity whose brightness is equal to a predetermined value.

BRIEF DESCRIPTION OF THE DRAWINGS

Other aims, characteristics and advantages of the present invention will emerge clearly from the description which will now be made of an example embodiment given non-limitingly, with reference to the accompanying drawings, in which.

DESCRIPTION OF THE PREFERRED EMBODIMENTS

Figure 1:
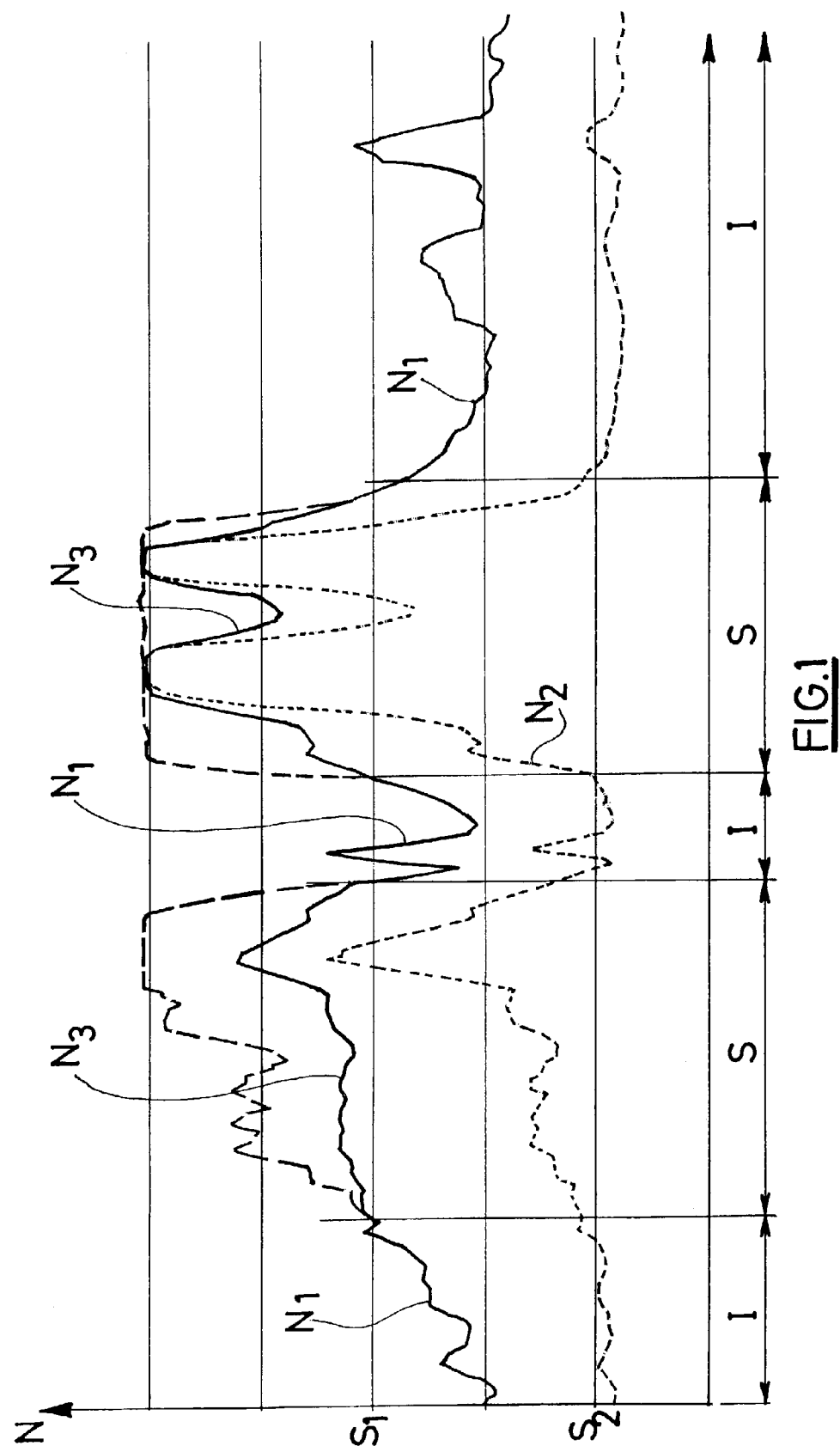
FIG. 1 depicts a diagram of a line of an image perceived by a CCD sensor and its various processing steps.

An image display device conventionally comprises an optical system forming, from a scene or an object to be observed, an actual image on a photosensitive device. Such a photosensitive device is as is known composed of a matrix of photosensitive elements, each photosensitive element generating an electrical signal proportional to the light intensity which it receives. The electrical signals generated by each photosensitive element are then transmitted, by means of a signal processing device, to a display device in order to be displayed on a screen by an observer.

When the light intensity of the light striking one of the photosensitive elements is included in the range of values which these photosensitive elements can correctly restore, the image signal can be used directly.

When the light intensity of the light striking one of the photosensitive elements rises until it reaches a predetermined value, the photosensitive element generates a maximum electrical signal corresponding to its saturation. If the light intensity continues to increase, the phenomenon known as "blooming" is then observed, in which the photosensitive element generates excess charges which then interfere with the adjoining photosensitive elements in the matrix of photosensitive elements constituting the photosensitive device. The result is that the display device in its turn receives a signal comprising components reaching a maximum value for certain points on the image to be restored, and for the points adjacent to these blooming points.

On the image restored by the display screen, there then exists an extensive area surrounding the blooming points proper and in which no further detail is perceptible, although in the original scene the corresponding points emitted only a light intensity which was entirely acceptable to the photosensitive element on which the optical system was forming the image of this point. In other words, a very bright object whose apparent size represents for example a surface of N pixels will be displayed by the display device as a surface of M pixels, with M very much greater than N.

This is what has been shown in FIG. 1. In this figure, the lower curve in a dotted line represents the theoretical signal which would be generated by a perfect sensor, and the upper curve in a dashed line represents the actual signal generated by a CCD sensor. It can be seen in this figure that, in the vicinity of the areas where the theoretical signal reaches a maximum level, the actual signal presents a maximum level thus masking areas where it might be important to have information available.

The present invention proposes to resolve this problem. In accordance with a first embodiment of the present invention, the photosensitive device on which there is formed the actual image of the scene to be observed is controlled so as to supply image signals at a frequency twice as great as that at which the images are displayed on the final display device. For each final image displayed, there are therefore available two image sources. For example, if the images displayed on the display device are at a rate of 25 images per second, the photosensitive device will be controlled so as to pick up 50 images per second.

According to the present invention, provision is made for one of these two images to be the one which is generated from the image signals generated by the photosensitive device when it is supplied according to its nominal operating characteristics. This final image is therefore optimal for the points in the photosensitive device receiving a low light flux. However, this first image may also contain blooming areas coming on the one hand from the photosensitive elements receiving an excessively great light flux and on the other hand from the photosensitive elements adjacent to these. These various points then give rise to an area of the final image which is illegible around the point or points emitting a high light flux. This first image can therefore be referred to as a "sensitive image" or "light image". The upper curve in FIG. 1 in a dashed line represents a line of this light image.

The other image is the one which is generated from the image signals generated by the photosensitive device when it is supplied according to modified operating characteristics. More precisely, this second image is underexposed so that the blooming points in the first image are visible clearly, just like their immediate vicinity. On the other hand, the points contained in the weakly illuminated areas are much more difficult to perceive. This second image can therefore be referred to as a "low sensitivity image" or "dark image". Such an underexposure can be obtained for example by electronic control of the photosensitive device, or by an obturator having two unequal openings presented successively in front of the photosensitive device. The lower curve in a dotted line in FIG. 1 represents a line of this dark image corresponding to the same points as those of the light image.

According to the present invention, the final image containing no blooming areas is obtained from the characteristics of the light image and the dark image. More precisely, means of processing the signal analyse in real time the signals representing the light image and the dark image as just defined, and more particularly they determine their brightness level.

According to the brightness level of an elementary point of the light image, the processing means calculate the brightness level which the corresponding elementary point of the final image displayed on the display device should have.

According to a first method of processing the signal:
there is determined first of all, for any elementary point on the final image, a predetermined threshold value $S_1$ of the brightness level $N_1$ of the corresponding point of the light image, and a predetermined threshold value $S_2$ of the brightness level $N_2$ of the corresponding point of the dark image, for example by means of a look-up table,
if the brightness level $N_1$ of an elementary point on the light image is less than the first predetermined threshold value $S_1$, for example 150 if the maximum level is 255, the brightness level $N_3$ of the corresponding elementary point on the final image will be that of the corresponding elementary point of the clear image,
if the brightness level $N_1$ of an elementary point on the light image is higher than the first predetermined threshold value $S_1$, 150 in the example chosen, the brightness level $N_3$ of the corresponding elementary point on the final image will be calculated according to brightness level of the corresponding elementary point on the dark image $N_2$.

In this way there is obtained a final image represented in FIG. 1 by the curve in a solid line. It is for example possible to calculate the brightness level $N_3$ of an elementary point of the final image by means of a function of the brightness level $N_2$ of the elementary point of the dark image for any elementary point of the light image having a brightness level $N_1$ higher than the first predetermined threshold value $S_1$.

Preferably, in order not to make the calculations carried out in real time unwieldy, the function of the brightness levels of the elementary points in the dark image corresponding to elementary points in the light image whose brightness level is greater than the first predetermined threshold value $S_1$ will be a linear function. If the photosensitive device is capable of distinguishing K different brightness levels, such a function can for example be of the form:

$$N_3 = N_2 + (S_1 - S_2) * \frac{(K - N_2)}{(K - S_2)}$$

Such a calculation method gives the results shown in FIG. 1. For the points in the light image whose brightness level is equal to the first predetermined threshold value $S_1$, the corresponding points in the dark image have a brightness level $S_2$.

The points in the light image whose brightness level is less than the first predetermined threshold value $S_1$ are kept in order to form the corresponding points in the final image. These points are situated in the regions I in FIG. 1.

The points in the light image whose brightness level is greater than the first predetermined threshold value $S_1$ are replaced by corresponding points in the dark image whose brightness has been increased, for example according to the above function. These points are situated in the regions S in FIG. 1, on the intermediate curves.

According to a second method of processing the signal:
if the brightness level of an elementary point on the light image is equal to a maximum value, for example 255, the brightness level of the corresponding elementary point on the final image will be that of the corresponding elementary point on the dark image,
if the brightness level of an elementary point on the light image is less than or equal to a predetermined threshold value, the brightness level of the corresponding elementary point on the final image will be that of the corresponding elementary point on the light image, and
if the brightness level of an elementary point on the light image is greater than the predetermined threshold value, the brightness level of the corresponding elementary point on the final image will be calculated according to the brightness levels of the corresponding elementary points on the light image and on the dark image.

Preferably again, in order not to make the calculations carried out in real time unwieldy, the function of the brightness levels of the corresponding elementary points on the light image and on the dark image will be a linear function. It may for example be of the form:

$$N_{(P_{3(i,j)})} = \left(N_{(P_{1(i,j)})} * \left(\frac{N_{\max} - N_{(P_{1(i,j)})}}{N_{\max} - N_s}\right)\right) + \left(N_{(P_{2(i,j)})} * \left(1 - \frac{N_{\max} - N_{(P_{1(i,j)})}}{N_{\max} - N_s}\right)\right)$$

where, for each pair of coordinates i and j:
$P_{1(i,j)}$ is an elementary point on the light image,
$P_{2(i,j)}$ is an elementary point on the dark image,
$P_{3(i,j)}$ is an elementary point on the image displayed on the display device,
$N_{(P_{1(i,j)})}$ is the brightness level of the elementary point $P_{1(i,j)}$,
$N_{(P_{2(i,j)})}$ is the brightness level of the elementary point $P_{2(i,j)}$,
$N_{(P_{3(i,j)})}$ is the brightness level of the elementary point $P_{3(i,j)}$,
$N_{max}$ is the maximum brightness level of the light image, and
$N_s$ is the brightness level of the predetermined threshold.

In this way, whatever the method of processing the signal, the brightness levels of the elementary points in the final image are adjusted continuously, so as to keep the best sensitivity in the areas of the image where the brightness levels are below a predetermined threshold, and so as to improve the visibility of the areas close to blooming sources, and whose brightness level is higher than this predetermined threshold.

Provision can advantageously be made for the predetermined threshold for the brightness level of the light image to be adjustable, for example continuously, so as to be able to take account for example of the ambient brightness, various atmospheric conditions, etc.

One possible variant of this second method of processing the signal consists of delivering to the display device, for each elementary point, a brightness level equal to that of the corresponding point on the light image when the latter has a brightness level below a predetermined threshold, equal to a weighted sum of the brightness levels of the corresponding points on the light and dark images for each point of the light image whose brightness level is greater than or equal to the predetermined threshold.

Various tests showed that a good result was obtained when the brightness of the point on the final image was close to 30% of the brightness of the dark image and 70% of that of the light image.

According to a second embodiment of the present invention, the images with different sensitivities are obtained by means of distinct photosensitive devices. It is for example possible to provide for the actual image of the scene to be observed to be formed on two different photosensitive devices, for example a semi-transparent plate inclined at 45° to the optical axis of the image-forming optical system. The two photosensitive devices are preferably synchronised in order to supply to the image signal processing means image signals comprising elementary points which can be matched both in time and in space.

The two photosensitive devices have different sensitivities so as to supply usable signals as in the first embodiment. It is for example possible to choose, according to a first variant, photosensitive devices of the same technology, for example CCD sensors, where one has its nominal operating characteristics so as to give a light image as in the first embodiment and where the other has its operating characteristics modified in order to supply a dark image as in the first embodiment. Here also the dark image can be obtained by electronic control of the photosensitive device in order to obtain an underexposed image.

According to a second variant, it is possible to choose photosensitive devices of different technologies, for example a CCD sensor having nominal operating characteristics in order to provide a light image and a CMOS sensor for supplying a dark image.

The processing of these two images in order to form the final image with no blooming areas, according to the two variants which have been disclosed above, is identical to that disclosed for the first embodiment and will not therefore be repeated in detail.

So as to optimise the processing speed, provision can be made for carrying out the processing of the image signals only when the light image has blooming areas. A detector for the total brightness of the scene to be observed could then be used for this purpose. In order not to increase the number of components used and the complexity of the device, and not to increase the cost of the processing, the invention makes provision for using for this purpose the characteristics of the dark image.

When the processing step consisting of determining the brightness level of each elementary point of the dark image is carried out, it suffices in fact to count the number of elementary points on this dark image whose brightness is equal to a predetermined value, for which the elementary points will be referred to as "white" points. So as to be certain that this dark image will not itself be subject to the phenomenon of blooming, it is possible to adjust the gain of the sensor or of the camera supplying this dark image to a predetermined value so that the charges generated by these white points do not interfere with the adjoining elementary points.

If the number of white points in the dark image is zero or small, that is to say less than a predetermined threshold $N_1$, it is then certain that the light image of the same scene is not subject to the phenomenon of blooming. It is then not necessary to carry out the processing of the signal which was described previously. It will then suffice to use the light image signal for the final image without making it undergo any processing.

If the number of white points in the dark image is higher than the predetermined threshold $N_1$, the risk exists that the light image of the same scene may exhibit the phenomenon of blooming. It is then necessary to carry out the processing of the signal described previously.

In order to prevent phenomena of flicker when the number of white points in the dark image is close to the threshold $N_1$, it is possible to create a hysteresis in the activation of the processing, by predetermining a second threshold $N_2$ below the first threshold $N_1$. When the number of white points in the dark image is greater than the first threshold $N_1$, then the processing of the signal is activated. When the number of white points in the dark image is less than the second threshold $N_2$, then the processing of the signal is inhibited. By suitably choosing the values $N_1$ and $N_2$ it will be certain that there will be a perfectly stable final image.

As a variant, it is also possible to envisage not carrying out the processing when the number of white points is below the second threshold $N_2$, carrying out processing when the number of white points is higher than the first threshold $N_1$, and carrying out a progressive processing between these two thresholds.

There has therefore been implemented according to the present invention a method of processing in real time the signal generated by a photosensitive device, in order to supply a scene or an object having a high dynamic range between the signal corresponding to the darkest areas and the signal corresponding to the brightest areas, an image of high sensitivity free from blooming areas and in which the areas whose brightness is below a predetermined threshold are sufficiently contrasted, the predetermined threshold being able to be adjusted, for example according to the ambient brightness or other criteria. Such a method is implemented with photosensitive devices which have not undergone any modification. The result is therefore that the method according to the present invention makes it possible to greatly increase the quality of the image display having a high dynamic range, without substantially increasing the cost of the image acquisition and restoration device.

Naturally the present invention is not limited to the embodiments which have been described, but a person skilled in the art will on the contrary be able to make many modifications to it which come within its scope. Thus for example it will be possible to provide any number of predetermined thresholds in the light image in order to carry out differentiated signal processings according to the various ranges of brightness levels which it is wished to take into consideration. It will thus be possible to refine the final result as required. In this case, it will be necessary to have as many images of different sensitivities. For example, if two predetermined thresholds are fixed, it will be necessary to be able to have available three images with different sensitivities in order to supply a single final image.

The invention claimed is:

1. Method for the real-time processing of a signal representing an image generated by at least one photosensitive device in order to supply, from a scene to be observed having a high dynamic range between signals corresponding to the darkest areas and those which correspond to the brightest areas, an image free from blooming areas, the method comprising the steps:

forming an actual image of the scene to be observed on the photosensitive device by an optical system, controlling the photosensitive device to generate per second a first predetermined number of image signals of the scene to be observed, collecting the image signals generated by the photosensitive device, processing the image signals generated by the photosensitive device, converting the processed signals into video signals, delivering the video signals to a display device, displaying on the display device a second predetermined number of images per second corresponding to the processed image signals, the step of controlling the photosensitive device comprising the generation of image signals of the same scene to be observed with at least first and second different sensitivities, the first sensitivity being greater than the second, the step of processing the signals generated by the photosensitive device itself comprises the steps:

determining the brightness level of each elementary point on the image having the first sensitivity and of each elementary point on the image having the second sensitivity, and delivering to the display device for each elementary point on the final image an image signal calculated according to the levels of brightness of the same elementary point in the images of first sensitivity and second sensitivity, wherein the method further comprises the steps:

comparing the brightness level of each elementary point of the image of first sensitivity with a predetermined threshold, delivering to the display device, for each elementary point on the image of first sensitivity having a brightness level below the predetermined threshold, the signal of the image of first sensitivity, and delivering to the display device, for any other elementary point on the image of first sensitivity, an image signal equal to a weighted sum of the brightness levels of the same elementary point in the images of first sensitivity and second sensitivity.

2. Method according to claim 1, wherein, for each elementary point on the image of first sensitivity whose brightness level is greater than or equal to the predetermined threshold, the brightness level of the signal delivered to the display device consists of approximately 30% of the brightness level of the image of second sensitivity and 70% of the brightness level of the image of first sensitivity.

3. Method according to claim 1, wherein the images of first and second sensitivities are obtained by distinct photosensitive devices.

4. Method according to claim 3, wherein the photosensitive devices are synchronized to supply image signals comprising a plurality of elementary points which can be matched both in time and in space.

5. Method according to claim 1, wherein the image signal processing step is performed only when the image of first sensitivity has blooming areas.

6. Method according to claim 5, wherein the brightness of the scene to be observed is measured by a detector.

7. Method according to claim 6, wherein the detector consists of a counter for the number of elementary points in the image of second sensitivity whose brightness is equal to a predetermined value.

8. A method for providing an image free from blooming areas, the method comprising:

obtaining an image of a scene to be observed on a photosensitive device;

generating per unit of time a predetermined number of image signals of the scene to be observed with at least first and second different sensitivities, the first sensitivity being greater than the second;

determining the brightness level of each elementary point on the image having the first sensitivity and of each elementary point on the image having the second sensitivity;

comparing the brightness level of each elementary point of the image of first sensitivity with a predetermined threshold; and displaying an image signal calculated, for each elementary point of a final image, according to the brightness levels of the same elementary point in the images of first sensitivity and second sensitivity, wherein the calculated image signal comprises the signal of the image of first sensitivity, for each elementary point on the image of first sensitivity having a brightness level below a predetermined threshold, and comprises an image signal calculated according to the brightness levels of the same elementary point in the images of first sensitivity and second sensitivity, for any other elementary point on the image of first sensitivity, and wherein a function of the brightness level ($N_3$) of the elementary point of the final image corresponding to an elementary point on the image of first sensitivity having a brightness level that is above the predetermined threshold is of the form:

$$N_3 = N_2 + (S_1 - S_2) * \frac{(K - N_2)}{(K - S_2)}$$

where:

$N_2$ is the brightness level of the elementary point on the image of second sensitivity corresponding to an elementary point on the image of first sensitivity having a brightness level above the predetermined threshold, $S_1$ is the predetermined threshold value for an elementary point on the image of first sensitivity, $S_2$ is the brightness level of the elementary point on the image of second sensitivity corresponding to a point on the image of first sensitivity having a brightness level equal to $S_1$, and K is a number of different brightness levels which the photosensitive device is capable of distinguishing.

9. A method for providing an image free from blooming areas, the method comprising:

generating at least two input image signals of a scene to be observed on at least one photosensitive device, the first input image signal having a first sensitivity greater than a second sensitivity of the second input image signal;

calculating output image signals based on brightness levels the two input image signals at corresponding elementary points; and displaying the output image signals, wherein, for each elementary point, a brightness level of the output image signals is calculated as follows:

(i) when a brightness level of the first input image signal is less than or equal to a predetermined threshold, the brightness level of the output signals is equal to a corresponding elementary point of the first input image signal, (ii) when a brightness level of the first input image signal is equal to a maximum value, the brightness level of the output signals is equal to a corresponding elementary point of the second input image signal, and (iii) when a brightness level of the first input image signal is between the predetermined threshold and the maximum value, the brightness level of the signal is calculated by a linear equation to be between the brightness levels of the corresponding elementary points of the first and second input image signals.

10. Method according to claim 9, wherein the linear equation is of the form:

$$N_{(P_{3(i,j)})} = \left(N_{(P_{1(i,j)})} * \left(\frac{N_{max} - N_{(P_{1(i,j)})}}{N_{max} - N_s}\right)\right) + \left(N_{(P_{2(i,j)})} * \left(1 - \frac{N_{max} - N_{(P_{1(i,j)})}}{N_{max} - N_s}\right)\right)$$

where, for each pair of coordinates i and j of an elementary point:

$P_{1(i,j)}$ is an elementary point on the image of first sensitivity, $P_{2(i,j)}$ is an elementary point on the image of second sensitivity, $P_{3(i,j)}$ is an elementary point on the image displayed on the display screen, $N_{(P_{1(i,j)})}$ is the brightness level of the elementary point $P_{1(i,j)}$, $N_{(P_{2(i,j)})}$ is the brightness level of the elementary point $P_{2(i,j)}$, $N_{(P_{3(i,j)})}$ is the brightness level of the elementary point $P_{3(i,j)}$, $N_{max}$ is the maximum brightness level of the image of first sensitivity, and $N_s$ is the brightness level of the predetermined threshold.

* * * * *